(12) United States Patent
R.

(10) Patent No.: US 8,134,475 B2
(45) Date of Patent: Mar. 13, 2012

(54) BACKLIGHTING REMOTE CONTROLS

(75) Inventor: William Reams R., Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 162 days.

(21) Appl. No.: 12/404,848

(22) Filed: Mar. 16, 2009

(65) Prior Publication Data

US 2010/0231384 A1 Sep. 16, 2010

(51) Int. Cl.
*G08B 5/00* (2006.01)

(52) U.S. Cl. ................ 340/815.4; 340/825.71

(58) Field of Classification Search ........... 340/825.71–825.76, 815.4; 341/176
See application file for complete search history.

(56) References Cited

U.S. PATENT DOCUMENTS

| | | |
|---|---|---|
| 4,067,000 A | 1/1978 | Carlson |
| 4,231,026 A | 10/1980 | Sullivan |
| 4,578,671 A | 3/1986 | Flowers |
| 4,598,243 A | 7/1986 | Kawakami |
| 5,115,236 A | 5/1992 | Koehler |
| 5,164,652 A | 11/1992 | Johnson |
| 5,204,657 A | 4/1993 | Prosser |
| 5,294,915 A | 3/1994 | Owen |
| 5,455,560 A | 10/1995 | Owen |
| 5,506,572 A | 4/1996 | Hills |
| 5,519,760 A | 5/1996 | Borkowski et al. |
| 5,583,491 A | 12/1996 | Kim |
| 5,598,143 A | 1/1997 | Wentz |
| 5,638,050 A | 6/1997 | Sacca |
| 5,684,471 A | 11/1997 | Mark et al. |
| 5,705,997 A | 1/1998 | Park |
| 5,926,090 A | 7/1999 | Taylor |
| 5,945,918 A | 8/1999 | McGonigal |
| 5,963,010 A | 10/1999 | Hayashi |
| 5,990,868 A | 11/1999 | Frederick |
| 5,999,799 A | 12/1999 | Hu |
| 6,002,450 A | 12/1999 | Darbee |
| 6,191,551 B1 | 2/2001 | Fischer |
| 6,230,277 B1 | 5/2001 | Nakaoka et al. |
| 6,295,002 B1 | 9/2001 | Fukuda |
| 6,373,256 B1 | 4/2002 | Hanjani |
| 6,407,779 B1 * | 6/2002 | Herz .................. 348/734 |
| 6,449,726 B1 | 9/2002 | Smith |
| 6,535,125 B2 | 3/2003 | Trivett |
| 6,573,832 B1 | 6/2003 | Fugere-Ramirez |

(Continued)

FOREIGN PATENT DOCUMENTS

EP 1435563 7/2004

(Continued)

OTHER PUBLICATIONS

Reams, William, U.S. Appl. No. 12/056,819, filed Mar. 27, 2008 entitled "Reduction of Power Consumption in Remote Control Electronics".

(Continued)

*Primary Examiner* — Daniel Previl

(74) *Attorney, Agent, or Firm* — Dorsey & Whitney LLP

(57) ABSTRACT

A remote control includes sensing circuitry operable to detect a user touching the remote control. The remote control further includes a light source operable to backlight user input circuitry of the remote control. Control logic of the remote control activates the light source responsive to the sensing circuitry detecting the user touching the remote control.

14 Claims, 7 Drawing Sheets

U.S. PATENT DOCUMENTS

| | | | |
|---|---|---|---|
| 6,633,281 | B2 | 10/2003 | Lin et al. |
| 6,664,744 | B2 | 12/2003 | Dietz |
| 6,725,064 | B1 | 4/2004 | Wakamatsu |
| 6,771,182 | B1 * | 8/2004 | Loh et al. .................. 340/825.72 |
| 6,791,467 | B1 | 9/2004 | Ben-Ze'ev |
| 6,938,101 | B2 | 8/2005 | Hayes |
| 6,985,069 | B2 | 1/2006 | Marmaropoulos |
| 7,009,528 | B2 | 3/2006 | Griep |
| 7,047,333 | B2 | 5/2006 | Leung et al. |
| 7,362,227 | B2 * | 4/2008 | Kim .............................. 340/571 |
| 7,474,248 | B2 * | 1/2009 | Nakamura et al. ............ 341/176 |
| 7,738,792 | B2 | 6/2010 | Flachs et al. |
| 7,757,105 | B2 | 7/2010 | Okazaki |
| 7,852,255 | B2 * | 12/2010 | Rapisarda ..................... 341/176 |
| 7,907,060 | B2 | 3/2011 | Reams |
| 8,009,054 | B2 | 8/2011 | Reams |
| 8,082,455 | B2 | 12/2011 | Reams |
| 2002/0085128 | A1 | 7/2002 | Stefanik |
| 2002/0093481 | A1 | 7/2002 | Kehlstadt |
| 2002/0126094 | A1 | 9/2002 | Junod et al. |
| 2003/0026424 | A1 | 2/2003 | McGarrahan |
| 2003/0035074 | A1 | 2/2003 | Dubil |
| 2003/0159146 | A1 | 8/2003 | Kim |
| 2004/0095152 | A1 | 5/2004 | Ho |
| 2004/0096051 | A1 | 5/2004 | Kim et al. |
| 2004/0148632 | A1 | 7/2004 | Park |
| 2004/0161031 | A1 | 8/2004 | Kwentus |
| 2004/0203374 | A1 | 10/2004 | Zilliacus |
| 2004/0235446 | A1 | 11/2004 | Flaherty et al. |
| 2004/0250273 | A1 | 12/2004 | Swix |
| 2004/0252271 | A1 | 12/2004 | Wabiszczewicz |
| 2005/0033887 | A1 | 2/2005 | Hyo-Dae et al. |
| 2005/0073497 | A1 | 4/2005 | Kim |
| 2005/0146438 | A1 | 11/2005 | Giger |
| 2006/0017581 | A1 | 1/2006 | Schwendinger et al. |
| 2006/0034611 | A1 | 2/2006 | Li |
| 2006/0081771 | A1 | 4/2006 | Eliad |
| 2007/0018845 | A1 | 1/2007 | Sutardja |
| 2007/0080823 | A1 | 4/2007 | Fu |
| 2007/0130609 | A1 | 6/2007 | Han et al. |
| 2007/0185968 | A1 | 8/2007 | White |
| 2007/0279332 | A1 * | 12/2007 | Fryer et al. ...................... 345/76 |
| 2008/0040758 | A1 | 2/2008 | Beetcher et al. |
| 2008/0098426 | A1 | 4/2008 | Candelore |
| 2008/0163049 | A1 | 7/2008 | Krampf |
| 2008/0267435 | A1 | 10/2008 | Schumaier |
| 2008/0312852 | A1 | 12/2008 | Maack |
| 2009/0002218 | A1 | 1/2009 | Rigazio et al. |
| 2009/0007001 | A1 | 1/2009 | Morin et al. |
| 2009/0122206 | A1 | 5/2009 | Jung |
| 2009/0174653 | A1 | 7/2009 | Shin et al. |
| 2009/0241052 | A1 | 9/2009 | Ha et al. |
| 2009/0243909 | A1 | 10/2009 | Reams |
| 2009/0249086 | A1 | 10/2009 | Reams |
| 2009/0262254 | A1 | 10/2009 | Reams |
| 2009/0278701 | A1 | 11/2009 | Reams |
| 2009/0303097 | A1 | 12/2009 | Reams |
| 2010/0013551 | A1 | 1/2010 | Reams |
| 2011/0163886 | A1 | 7/2011 | Reams |
| 2011/0285540 | A1 | 11/2011 | Reams |

FOREIGN PATENT DOCUMENTS

| | | |
|---|---|---|
| EP | 1617315 | 1/2006 |
| EP | 1884869 | 2/2008 |
| GB | 2331610 | 5/1999 |
| GB | 2347592 | 9/2000 |
| GB | 2398138 | 8/2004 |
| JP | 01114298 | 5/1989 |
| JP | 04148499 | 5/1992 |
| JP | 10334380 | 12/1998 |
| JP | 00130848 | 5/2000 |
| JP | 2001-268658 | 9/2001 |
| JP | 04092946 | 3/2004 |
| JP | 06020386 | 1/2006 |
| JP | 2008-028584 | 2/2008 |
| KR | 2009-0047831 | 5/2009 |
| WO | WO 2007/023437 | 3/2007 |
| WO | WO 2007/086633 | 8/2007 |
| WO | WO 2008/146095 | 12/2008 |

OTHER PUBLICATIONS

Reams, William, U.S. Appl. No. 12/056,520, filed Mar. 27, 2008 entitled "Systems and Methods for Controlling the Power State of Remote Control Electronics".
Reams, William, et al, U.S. Appl. No. 12/135,370, filed Jun. 9, 2008 entitled "Systems, Methods and Apparatus for Changing an Operational Mode of a Remote Control".
Reams, William, et al, U.S. Appl. No. 12/175,897, filed Jul. 18, 2008 entitled "Systems and Methods for Controlling Power Consumption in Electronic Devices".
International Search Report dated Jul. 20, 2009, PCT/US2009/037856, 2 pages.
International Search Report dated Jun. 24, 2009, PCT/US2009/037871, 4 pages.
International Search Report dated Jul. 8, 2009, PCT/US2009/042651, 5 pages.
International Search Report dated Aug. 27, 2009, PST/US2009/044302, 3 pages.
International Search Report dated May 26, 2010, PCT/US2010/026694, 4 pages.
International Search Report dated Jul. 2, 2009, PCT/US2009/039948, 5 pages.
Japanese Office Action dated Mar. 8, 2011, JP 02011-501939, 3 pages.
Osoinach, Bryce, "Proximity Capacitive Sensor Technology for Touch Sensing Applications," Proximity Sensing White Paper prepared for Freescale Semiconductor, Inc., Tempe, Arizona, 2007, 12 pages.
U.S. Appl. No. 12/056,819.
Preliminary Amendment dated Sep. 15, 2010, U.S. Appl. No. 12/056,819, 5 pages.
U.S. Appl. No. 12/056,520.
Preliminary Amendment dated Mar. 12, 2010, U.S. Appl. No. 12/056,520, 7 pages.
Office Action dated Oct. 8, 2010, U.S. Appl. No. 12/056,520, 11 pages.
Amendment and Response to Office Action dated Jan. 10, 2011, U.S. Appl. No. 12/056,620, 8 pages.
Office Action dated Jan. 27, 2011, U.S. Appl. No. 12/056,620, 11 pages.
Amendment and Response to Office Action dated Mar. 23, 2011, U.S. Appl. No. 12/056,620, 8 pages.
Terminal Disclaimer dated Mar. 23, 2011, U.S. Appl. No. 12/056,520, 1 page.
Final Office Action dated Apr. 15, 2011, U.S. Appl. No. 12/056,520, 10 pages.
Advisory Action dated Jun. 29, 2011, U.S. Appl. No. 12/056,520, 3 pages.
Request for Continued Examination dated Jul. 15, 2011, U.S. Appl. No. 12/056,520, 1 page.
U.S. Appl. No. 12/135,370.
Office Action dated Feb. 14, 2011, U.S. Appl. No. 12/135,370, 22 pages.
Amendment and Response to Office Action dated Apr. 19, 2011, U.S. Appl. No. 12/135,370, 15 pages.
Final Office Action dated Jun. 9, 2011, U.S. Appl. No. 12/135,370, 22 pages.
U.S. Appl. No. 12/104,291.
Office Action dated Jun. 25, 2010, U.S. Appl. No. 12/104,291, 18 pages.
Amendment and Response to Office Action dated Oct. 25, 2010, U.S. Appl. No. 12/104,291, 21 pages.
Final Office Action dated Jan. 6, 2011, U.S. Appl. No. 12/104,291, 18 pages.
Amendment and Response to Final Office Action and Terminal Disclaimer dated Mar. 7, 2011, U.S. Appl. No. 12/104,291 15 pages.
Notice of Allowance dated May 3, 2011, U.S. Appl. No. 12/104,291, 8 pages.

U.S. Appl. No. 12/117,628.
Office Action dated Jun. 25, 2010, U.S. Appl. No. 12/177,628, 20 pages.
Amendment and Response to Office Action dated Oct. 25, 2010, U.S. Appl. No. 12/177,628, 20 pages.
Notice of Allowance and Fee(s) Due dated Jan. 6, 2011, U.S. Appl. No. 12/177,628, 12 pages.
European Office Action dated Jul. 4, 2011, EP 09726361.0, 4 pages.
Notice of Allowance and Fee(s) Due dated Sep. 2, 2011, U.S. Appl. No. 12/056,520, 8 pages.
Amendment and Response to Office Action dated Aug. 5, 2011, U.S. Appl. No. 12/135,370, 14 pages.
Request for Continued Examination dated Sep. 7, 2011, U.S. Appl. No. 12/135,370, 1 page.
Korean Office Action dated Dec. 15, 2011, KR 10-2010-7023795, 1 page.

U.S. Appl. No. 12/056,819
Office Action dated Nov. 17, 2010, U.S. Appl. No. 12/056,819, 15 pages.
Amendment and Response to Office Action dated Jan. 11, 2012, U.S. Appl. No. 12/056,819, 11 pages.
U.S. Appl. No. 12/175,897.
Amendment and Response to Office Action dated Dec. 12, 2011, U.S. Appl. No. 12/175,897, 13 pages.
Office Action dated Oct. 26, 2011, U.S. Appl. No. 12/135,370, 29 pages.
U.S. Appl. No. 13/033,429.
Office Action dated Dec. 22, 2011, U.S. Appl. No. 13/033,429, 16 pages.
Amendment and Response to Office Action and two Terminal Disclaimers dated Jan. 19, 2011, U.S. Appl. No. 13/033,429, 4 pages.

* cited by examiner

BACKLIGHTING REMOTE CONTROLS

BRIEF DESCRIPTION OF THE DRAWINGS

The same number represents the same element or same type of element in all drawings.

DETAILED DESCRIPTION

Figure 1:
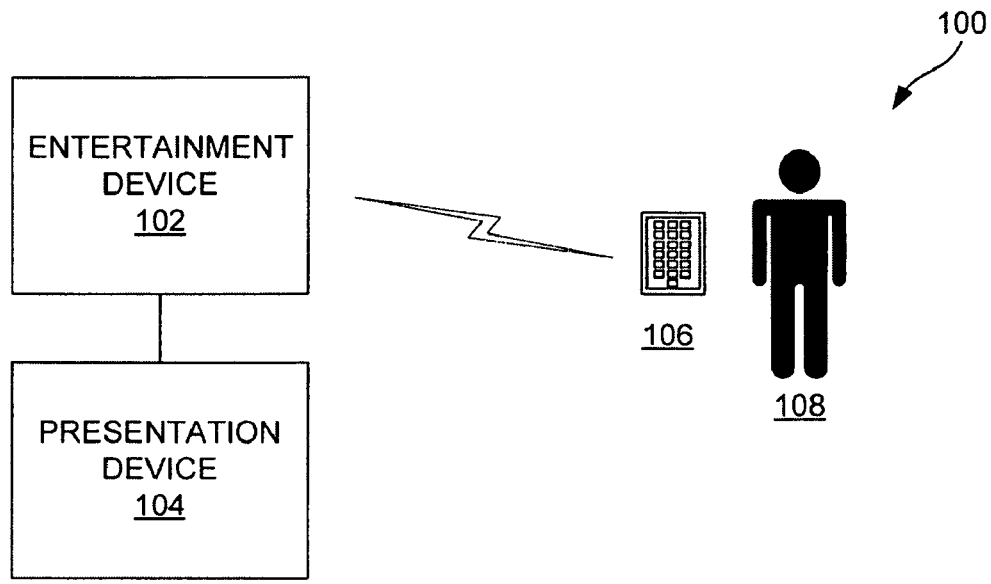
FIG. 1 illustrates an embodiment of an entertainment system.

The various embodiments described herein generally provide backlighting of remote controls for televisions, set-top boxes and other devices. Television remote controls are often difficult to see in dark rooms. If a viewer has not memorized the position of particular buttons, then the user may experience difficulty remotely operating the controlled device. Backlighting the buttons of a remote control provides the user with light to identify the functionality of various buttons of the remote control, allowing the user to easily select a desired button in the dark for controlling a particular functionality of the controlled device. However, backlighting of a remote control is power intensive and can quickly consume the power of the batteries for the remote control. Choosing when backlighting is desired by the user allows the battery power utilized for the backlighting to be minimized, allowing the battery to last longer. For example, it may be unnecessary to backlight the buttons of the remote control if the remote control is sitting on a coffee table, because the user is not likely using the remote control at the present time. Thus, a remote control may employ "smart" backlighting of its buttons. For example, the remote control may be backlit when held by a user and the backlighting may be turned off when not needed, e.g., when the user is not holding the remote control, conserving the battery power.

In at least one embodiment, a remote control includes sensing circuitry operable to detect a user touching the remote control. The remote control further includes a light source operable to backlight user input circuitry of the remote control. Control logic of the remote control activates the light source responsive to the sensing circuitry detecting the user touching the remote control. The sensing circuitry may take the form of various types of sensing devices that detect a user touching or otherwise moving a remote control.

In at least one embodiment, the sensing circuitry comprises a capacitive or resistive sensor that detects when a user is touching the remote control. A touch pad is an example of sensing circuitry operable to detect touch along a particular surface of a remote control. In other embodiments, the sensing circuitry may comprise a motion sensor operable to detect when the remote control is moving, which may be indicative of a user picking up the remote control. Accelerometers, gyroscopes and mercury switches are exemplary embodiments of motion sensors which may be utilized in accordance with the techniques described herein.

In at least one embodiment, control logic of the remote control may utilize multiple sensing inputs to determine when to backlight user input circuitry of the remote control. For example, the remote control may include sensing circuitry as described above and a light sensor operable to detect an amount of ambient light. The control logic operates to determine whether the user has touched or otherwise picked up the remote control. The control logic further operates to process the input from the light sensor to determine whether the backlighting is needed, e.g., when the room is dark. If the user is touching the remote control and the backlighting is needed, then the control logic operates to activate the remote control. Thus, the backlighting is not unnecessarily activated if the room is not dark and the user does not have problems identifying buttons without the backlighting.

A controlled device associated with the remote control is described herein as an entertainment device. More specifically, the controlled device may be described herein as a television receiver, e.g., a cable television receiver or a satellite television receiver. However, it is to be appreciated that the teachings described herein may be applied to other combinations of remote controls and controlled devices. For example, the teachings described herein may be applied to remote controls for household appliances, computers and wireless peripherals (e.g., keyboards, mice and pointing devices), automobile keyless entry systems, home security systems, child locator systems, digital video recorders (DVRs), DVD players, video servers, audio receivers, audio playback systems and the like. The remote control described herein may also be embodied as a wireless keyboard for a PC or other type of device.

FIG. 1 illustrates an embodiment of an entertainment system 100. The entertainment system 100 is operable for presenting content to a user 108. The entertainment system 100 includes an entertainment device 102, a presentation device 104 and a remote control 106. Each of these components is discussed in greater detail below. The entertainment system 100 may include other elements, components or devices not illustrated for the sake of brevity.

The entertainment device 102 is operable to receive content from one or more content sources (not shown in FIG. 1), and to present the received content to the user 108 on the associated presentation device 104. In at least one embodiment, the presentation device 104 is a display device (e.g., a television) configured to display content to the user 108. The entertainment device 102 may receive an audio/video stream in any format (e.g., analog or digital format) and output the audio/video stream for presentation by the presentation device 104. The entertainment device 102 may be further configured to display menus and other information that allow a user 108 to control the output of content by the entertainment device 102.

The presentation device 104 may comprise any type of device operable to present content to the user 108. In one embodiment, the presentation device 104 comprises a display device, such as a television, display monitor and the like. In other embodiments, the presentation device 104 comprises an audio playback device, such as an audio receiver, stereo system and the like. The entertainment device 102 and the presentation device 104 may be communicatively coupled using any type of wired or wireless connection, including coaxial cable, component or composite video cables, High Definition Multimedia Interface (HDMI) cabling, WiFi, Ethernet and the like.

The remote control 106 may be any system or apparatus configured to remotely control the output of content by the entertainment device 102. The remote control 106 may include user input circuitry, such as buttons, a touch pad, a trackball, a joystick, a keyboard, motion sensors and the like for receiving input from the user 108. The remote control 106 receives input from the user 108 and responsively generates commands regarding the operation of the entertainment device 102. For example, the remote control 106 may communicate commands to the entertainment device 102 requesting to playback content, temporally move through content (e.g., fast-forward or reverse), adjust the volume, access electronic programming guides, menus and the like. In at least one embodiment, the remote control 106 may output infrared (IR) key codes to remotely command the entertainment device 102. In other embodiments, the remote control 106 may issue commands to the entertainment device 102 via an RF communication protocol.

The remote control 106 may communicate with the entertainment device 102 and/or the presentation device 104 using any type of wireless communication link or protocol. For example, the remote control 106 may utilize radio frequency (RF) or infrared (IR) communication links for communicating with the entertainment device 102 and/or the presentation device 104. Exemplary communication protocols include Bluetooth, ZigBee and WiFi.

In at least one embodiment, the remote control 106 is further configured as a "universal" remote control, operable to remotely control other devices, such as the presentation device 104. In at least one embodiment, the remote control 106 stores command sets in memory for various devices, such as televisions, DVD players. VCRs and the like. Such command sets may be stored in a read only memory (ROM) or may be stored in an updateable storage medium, such as a flash memory. In at least one embodiment, the remote control 106 may include an updateable storage medium, such as flash, to store command sets for devices configured to operate with the remote control 106. For example, the entertainment device 102 may transfer selected command sets to the remote control 106 responsive to configuration of the remote control 106 to remotely operate a particular device.

As described above, the remote control 106 includes backlighting functionality. More particularly, the remote control 106 is operable to detect when the user 108 is holding the remote control 106 or otherwise using the remote control 106 and activate the backlighting accordingly. The remote control 106 backlights the user input interface of the remote control 106 while the user 108 is using the remote control. Thus, the user 108 may more easily utilize the remote control 106 in certain situations, such as within a dark room while watching the presentation device 104.

Figure 2:
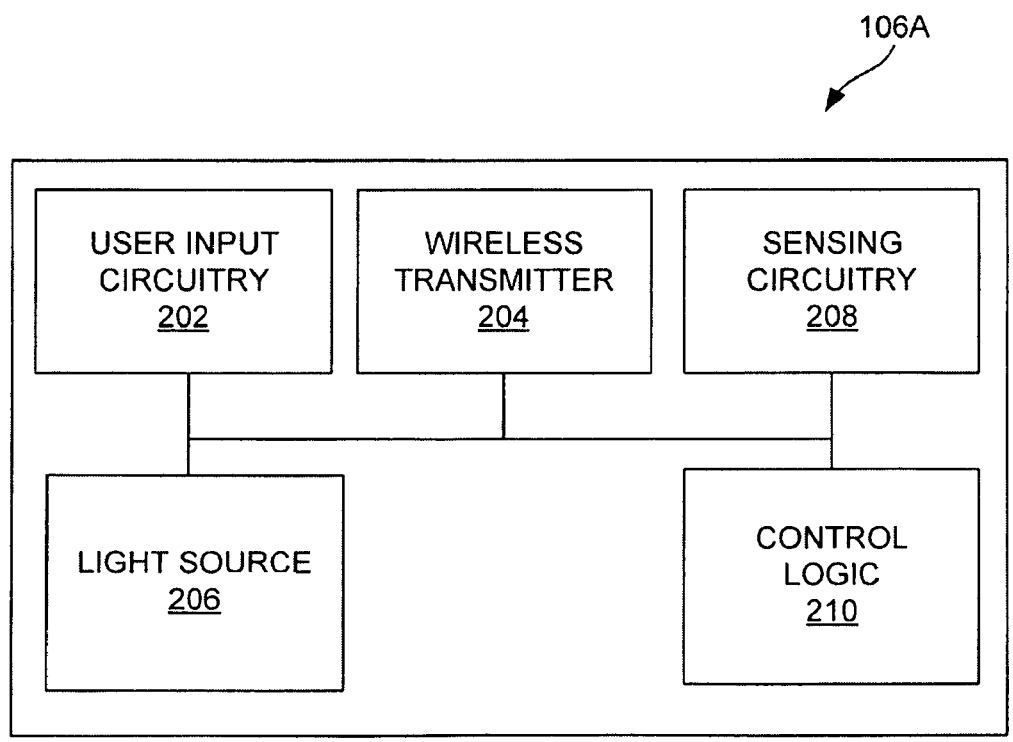
FIG. 2 illustrates an embodiment of a remote control of FIG. 1.

FIG. 2 illustrates an embodiment of a remote control of FIG. 1. FIG. 2 will be discussed in reference to the entertainment system 100 illustrated in FIG. 1. The remote control 106A includes user input circuitry 202, a wireless transmitter 204, a light source 206, sensing circuitry 208 and control logic 210. Each of these components will be discussed in greater detail below. The remote control 106A may include other elements, components or devices not illustrated for the sake of brevity.

The user input circuitry 202 is operable to receive and/or process user input from the user 108 (see FIG. 1). In at least one embodiment, the user input circuitry 202 is a keypad including a set of buttons. The user 108 may utilize the keypad to input channel numbers, control the volume of the entertainment device 102, navigate menus, manipulate the output of content by the entertainment device 102 and/or control other functions of the entertainment device 102 and/or the presentation device 104.

In at least one embodiment, the user input circuitry 202 comprises a positional information input device configured to solicit positional information from the user 108. The positional information input device receives motion input from the user 108 and translates the motion input into positional information utilized to generate commands for the entertainment device 102. For example, the positional information may be utilized to navigate an onscreen menu output by the entertainment device 102. In at least one embodiment, the motion input is utilized to position a cursor of the menu, and/or to make selections within the menu. A touch pad is one example of a positional information input device. In some embodiments, motion input may be utilized to change channels of the entertainment device 102. It is to be appreciated that motion input may be utilized to generate commands for a plurality of functions of the entertainment device 102. Other exemplary motion detector devices include mechanical switches, sliders, trackballs, gyroscopes and accelerometers. Motion detectors may be utilized that detect motion, vibration or acceleration among any number of axes. For example, a three element accelerometer may be utilized for detecting accelerations along an x, y and z axis.

The wireless transmitter 204 is operable to communicate with the entertainment device 102 and/or the presentation device 104. More particularly, the wireless transmitter 204 is operable to transmit commands and/or other data to the entertainment device 102 and/or the presentation device 104. The wireless transmitter 204 may utilize any type of wireless protocol and wireless communication medium, including RF or IR key codes or commands, to communicate with the entertainment device 102 (see FIG. 1) and/or the presentation device 104.

The wireless transmitter 204 is operable to transmit a key code and/or command message corresponding with user input to the entertainment device 102. In at least one embodiment, the wireless transmitter 204 is operable to bidirectionally communicate with the entertainment device 102 and/or the presentation device 104. For example, wireless transmitter 204 may exchange operational status queries and responses.

The light source 206 is operable to backlight the user input circuitry 202. The light source 206 may comprise a single source of light or multiple sources of light cooperatively operating to backlight the user input circuitry 202. For example, the user input circuitry 202 may comprise a keypad of buttons and the light source 206 may comprise multiple LED's, each operable to backlight one of the buttons. In another embodiment, a single LED or other type of light source may be utilized to backlight all of the buttons or a selected portion thereof.

In at least one embodiment, the user input circuitry 202 comprises a touch pad input device. The touch pad may include particular areas associated with specific functionalities of the entertainment device 102 and/or the presentation device 104. Thus, these particular areas and/or identifiers for the same may be backlight by the light source 206. For example, the light source 206 may illuminate number identifiers that correspond with channel input buttons mapped on the touch pad. In at least one embodiment, the touch pad is side lit so that the touch pad is illuminated across the surface instead of through the surface.

The sensing circuitry 208 is operable to detect the user 108 utilizing the remote control 106A. In at least one embodiment, the sensing circuitry 208 is operable to detect whether the user 108 is touching the remote control 106A. For example, the sensing circuitry 208 may be a capacitive or resistive sensor operable to detect whether the remote control 106A is being held by the user 108.

In at least one embodiment, capacitive sensors may be placed along the periphery of the remote control 106A where the user's 108 hands touch the remote control 106A when the user 108 is holding the remote control 106A. However, the capacitive sensors may be located anywhere on the remote control 106A according to desired design criteria. For example, the user input circuitry 202 may be a touch pad that receives input from the user 108. The sensing circuitry 208 may be integrated into the touch pad and may be operable to detect when the user 108 touches the user input circuitry 202.

In another embodiment, inductive or resistive sensors may be used for the sensing circuitry 208 that detect electrical properties of a user's 108 body by forming an electrical network with the user's 108 body. The inductive or resistive sensors may be placed on locations of the remote control 106A that are most likely to contact the user 108 during utilization of the remote control 106A. For example, the resistive or inductive sensors may be placed along the periphery or bottom of the remote control 106A.

In some embodiments, the sensing circuitry 208 may be operable to detect when the remote control 106A is being moved, possibly indicating that the user 108 is using the remote control. For example, the sensing circuitry 208 may detect movement of the remote control 106A after a period of inactivity, indicating that the user 108 has picked up the remote control 106A. Exemplary motion detector sensors include accelerometers, mercury switches and gyroscopes. As described above, the user input circuitry 202 may include motion detector circuitry operable to receive motion input from the user 108. Thus, in at least one embodiment, the motion detector circuitry of the sensing circuitry 208 and the user input circuitry 202 may be integrated. For example, the sensing circuitry 208 may detect initial motion input from the user 108 after a period of inactivity and may process the input accordingly. Subsequent input may be processed by the user input circuitry 202 and utilized to generate commands for the entertainment device 102 and/or the presentation device 104.

The control logic 210 is operable to control the operation of the remote control 106A. The control logic 210 may be a single processing device or a plurality of processing devices that cooperatively operate to control the operation of the remote control 106. The operation of the remote control 106A may be controlled by instructions executable by the control logic 210. Some examples of instructions are software, program code, and firmware.

The control logic 210 is operable to generate control commands for the entertainment device 102 responsive to the input provided to the user input circuitry 202 by the user 108 (see FIG. 1). The control commands may be in the form of key codes or other commands that are compatible with the entertainment device 102. The control commands may also allow for the control of the presentation device 104. The control logic 210 is also operable to process data received from the entertainment device 102.

The control logic 210 is operable to process input from the sensing circuitry 208 to determine whether the user 108 is touching/using the remote control 106A. If the control logic 210 receives input from the sensing circuitry 208 indicating that the user 108 is touching/using the remote control 106A, then the control logic 210 activates the light source 204 to backlight the user input circuitry 202. In at least one embodiment, the backlighting is activated for a specified period of time selected based on desired design criteria. For example, it may be determined that a user 108 may provide any desired input within thirty seconds of picking up the remote control 106A thus allowing the lighting to be turned off at the end of that period.

In at least one embodiment, the control logic 210 is operable to extend the period of the backlighting if the user 108 continues to provide input to the remote control 106A. In other words, if the backlighting is configured to turn off after a specified period of time and the user 108 continues to provide input to the user input circuitry 202, then the backlighting shut off period may be extended by a specified increment. For example, the initial shut off period for the backlighting may be thirty seconds. If the user 108 provides input at twenty nine seconds, then the shut off period may be extended by another ten seconds.

In at least one embodiment, the control logic 210 is operable to deactivate the light source 206 if a signal from the sensing circuitry 208 indicates that the user 108 is no longer touching/using the remote control 106A. For example, if the sensing circuitry 208 comprises a capacitive, inductive or resistive sensor that no longer detects contact with the user 108, then the backlighting may be turned off by the control logic 210. Similarly, if the sensing circuitry 208 comprises a motion sensor, then the control logic 210 may shut off the backlighting circuitry if no motion of the remote control 106A is detected. In at least one embodiment, the backlighting may be shut off a specified period of time after the last detection of the user 108 touching/using the remote control 106A. For example, the backlighting may be shut off ten seconds after the sensing circuitry 208 last detects the user 108 touching or otherwise moving the remote control 106A.

Figure 3:
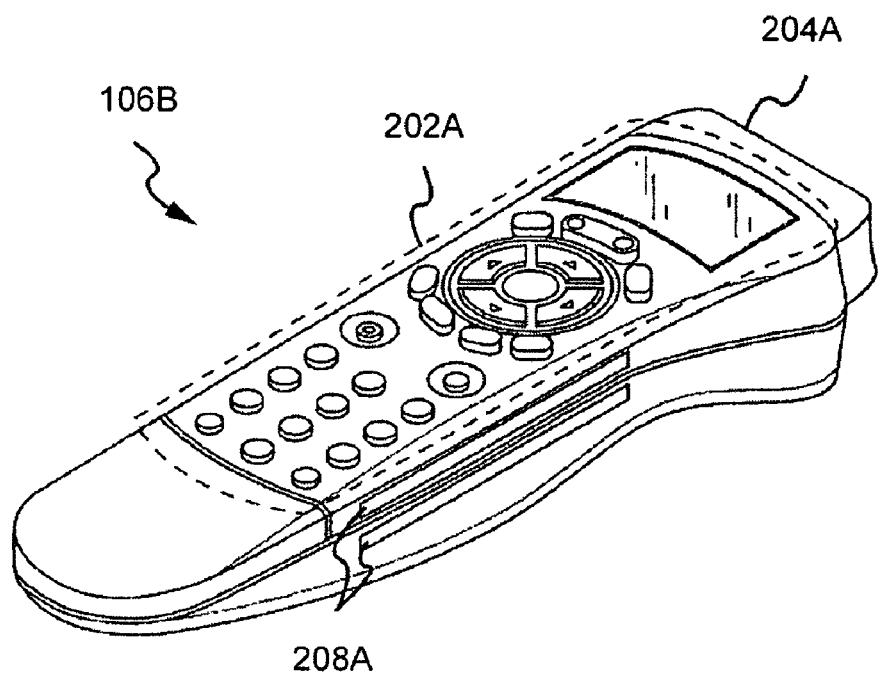
FIG. 3 illustrates an oblique perspective view of an embodiment of a remote control of FIG. 2.

FIG. 3 illustrates an oblique perspective view of an embodiment of a remote control of FIG. 2. FIG. 3 illustrates the buttons 202A, the wireless transceiver 204A and the capacitive sensors 208A of the remote control 106B and will be discussed in reference to the entertainment system 100 illustrated in FIGS. 1 and 2. The remote control 106B may include other components, elements or devices not illustrated for the sake of brevity.

The remote control 106B includes user input circuitry 202 (see FIG. 2) embodied as a plurality of buttons 202A that receive input from the user 108. The remote control 106B further includes a wireless transceiver 204A. The wireless transceiver 204A is operable to communicate with the entertainment device 102 (see FIG. 1). The communication between the wireless transceiver 204A and the entertainment device 102 may be uni-directional or bi-directional depending on desired design criteria.

Figure 4:
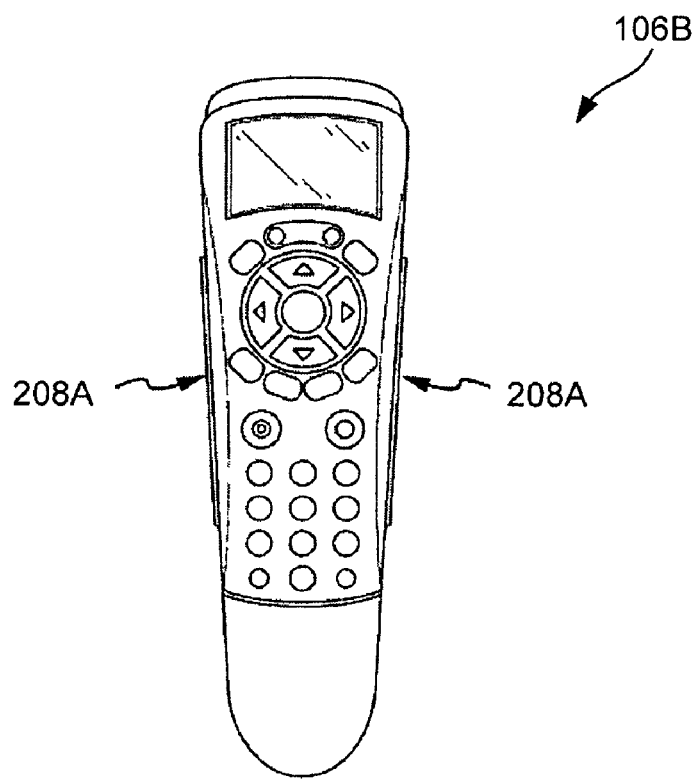
FIG. 4 illustrates a top plan view of the remote control showing the capacitive sensors on opposite sides of the remote control.

The sensing circuitry 208 (see FIG. 2) of the remote control 106B is embodied as several capacitive sensors 208A placed along the periphery of the remote control 106 where the user's 108 hands touch the remote control 106B. Thus, the control logic 210 (see FIG. 2) receives input from the capacitive sensors 208A when the user 108 picks up the remote control 106B and responsively activates the backlighting of the buttons 202A. FIG. 4 illustrates a top plan view of the remote control 106B showing the capacitive sensors on opposite sides of the remote control 106B. Additional potential locations include the bottom of a remote control if a user were expected to place their hand under the remote in order to use it.

Figure 5A:
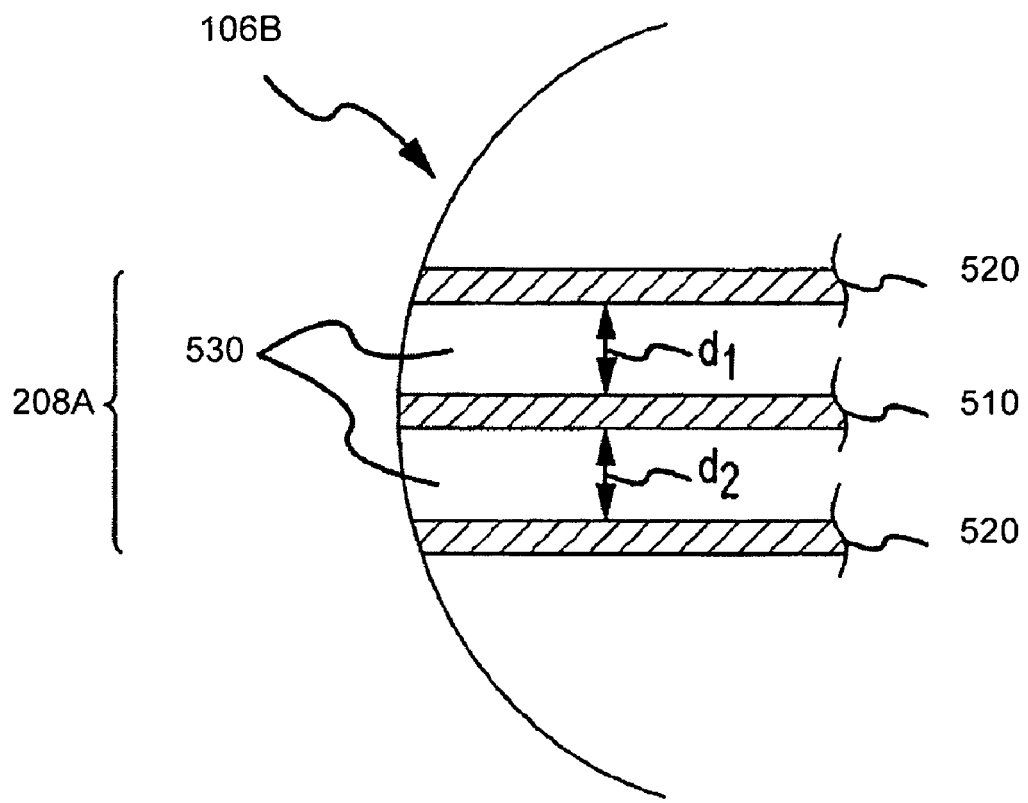
FIG. 5A represents a cross sectional view of the remote control, with the capacitive sensor shown in detail.
Figure 5B:
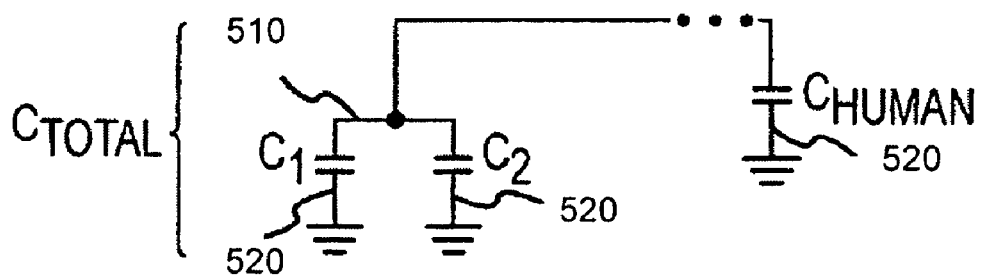
FIG. 5B shows a schematic representation of the total capacitance $C_{TOTAL}$ of the capacitive sensor from FIG. 5A with nodes indicating the positive and negative connections.

FIG. 5A represents a cross sectional view of the remote control 106B, with the capacitive sensor 208A shown in detail. In one example, the capacitive sensor 208A includes a plurality of electrodes 510 and 520, such as one or more positive electrodes 510 as well as one or more negative electrodes 520. The positive and negative electrodes 510 and 520 are sandwiched between a dielectric 530. Note that the positive electrode 510 is separated from the negative electrodes 520 by distances $d_1$ and $d_2$. In some embodiments, distances $d_1$ and $d_2$ are equal to each other, although in other embodiments they may not be. FIG. 5B shows a schematic representation of the total capacitance $C_{TOTAL}$ of the capacitive sensor 208A from FIG. 5A with nodes 510 and 520 indicating the positive and negative connections. The total capacitance $C_{TOTAL}$ is equal to the contributions of $C_1$ and $C_2$ that correspond to distances $d_1$ and $d_2$ as shown in Equation (1), where A corresponds to the surface area that electrodes 510 and 520 have in common and $\in$ reflects the dielectric constant of the material 530.

$$C_{TOTAL} = \varepsilon A \left( \frac{d_1 + d_2}{d_1 \cdot d_2} \right) \quad \text{Equation (1)}$$

Note that in the event that the distances $d_1$ and $d_2$ are not equal and/or different materials with different dielectric constants are used in the gaps between the positive and negative electrodes 510 and 520, then separate dielectric constants $\in_1$ and $\in_2$ may be reflected in the calculation as shown in Equation (2), below. In such a case, $\in_1$ reflects the dielectric constant of the material in the distance $d_1$, and $\in_2$ reflects the dielectric constant of the material in the distance $d_2$. In some embodiments, the value of $C_{TOTAL}$ is tuned by varying the thickness of the dielectrics of the material 530—i.e., modifying distances $d_1$ and $d_2$. For example, redundant electrodes may be implemented in place or in addition to either electrodes 510 or 520, and during operation the value of $C_{TOTAL}$ is tuned by selectively coupling in and out these redundant electrodes.

$$C_{TOTAL} = A \left( \frac{\varepsilon_2 \cdot d_1 + \varepsilon_1 \cdot d_2}{d_1 \cdot d_2} \right) \quad \text{Equation (2)}$$

Referring still to FIG. 5B, a capacitor $C_{HUMAN}$ schematically represents the capacitance resulting from a user picking up the remote control 106B. Capacitor $C_{HUMAN}$ generally has a value less than 300 pF, although in some implementations, this value is much smaller. It should be recognized that regardless of the implementation specific size of $C_{HUMAN}$, $C_{HUMAN}$ relates to an expected capacitance value associated with the user holding the remote control 106B.

Figure 5C:
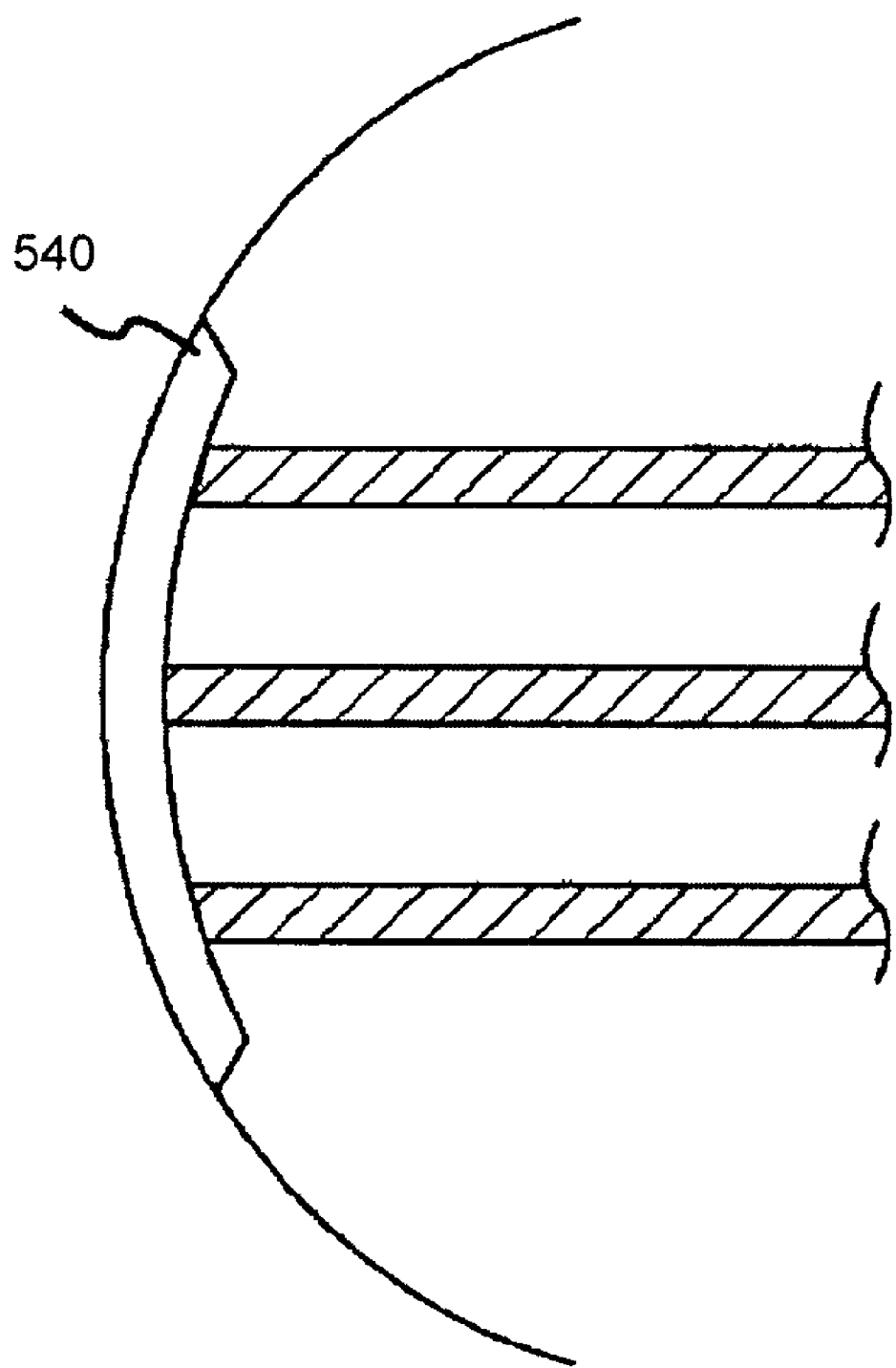
FIG. 5C represents the cross sectional view of the remote control from FIG. 5A, including an overlay.

Referring again to FIG. 5A, the capacitive sensor 208A may be implemented in a variety of forms, including as traces on either rigid circuit boards or flexible circuit boards. Regardless of whether the capacitive sensor 208A is implemented on rigid or flexible circuit boards or in another fashion, the positive and negative electrodes 510 and 520 may be maintained substantially parallel such that the separation distances $d_1$ and $d_2$ remain constant over the separation area A. In some embodiments, the positive and negative electrodes 510 and 520 are implemented in unused space along the circuit board housing additional electrical components of the remote control 106B. Additionally, in some embodiments, the capacitive sensor 208A running along the periphery of the remote control may be covered by an overlay 540 (see FIG. 5C) to protect the positive and negative electrodes 510 and 520. FIG. 5C represents the cross sectional view of the remote control from FIG. 5A, including the overlay 540. The overlay 540 may be any variety of material, such as plastic or glass, and Equations (1) and (2) would be modified accordingly to reflect the new value for $C_{TOTAL}$ accounting for the dielectric of overlay 540.

Thus, when the capacity, $C_{HUMAN}$ is detected by the capacitive sensor 208A, the control logic 210 (see FIG. 2) may operate to activate the light source 206. Thus, the buttons 202A are backlit by the light source 206 (see FIG. 2). This allows the user to more easily identify the functionality associated with each of the buttons 202A.

Figure 6:
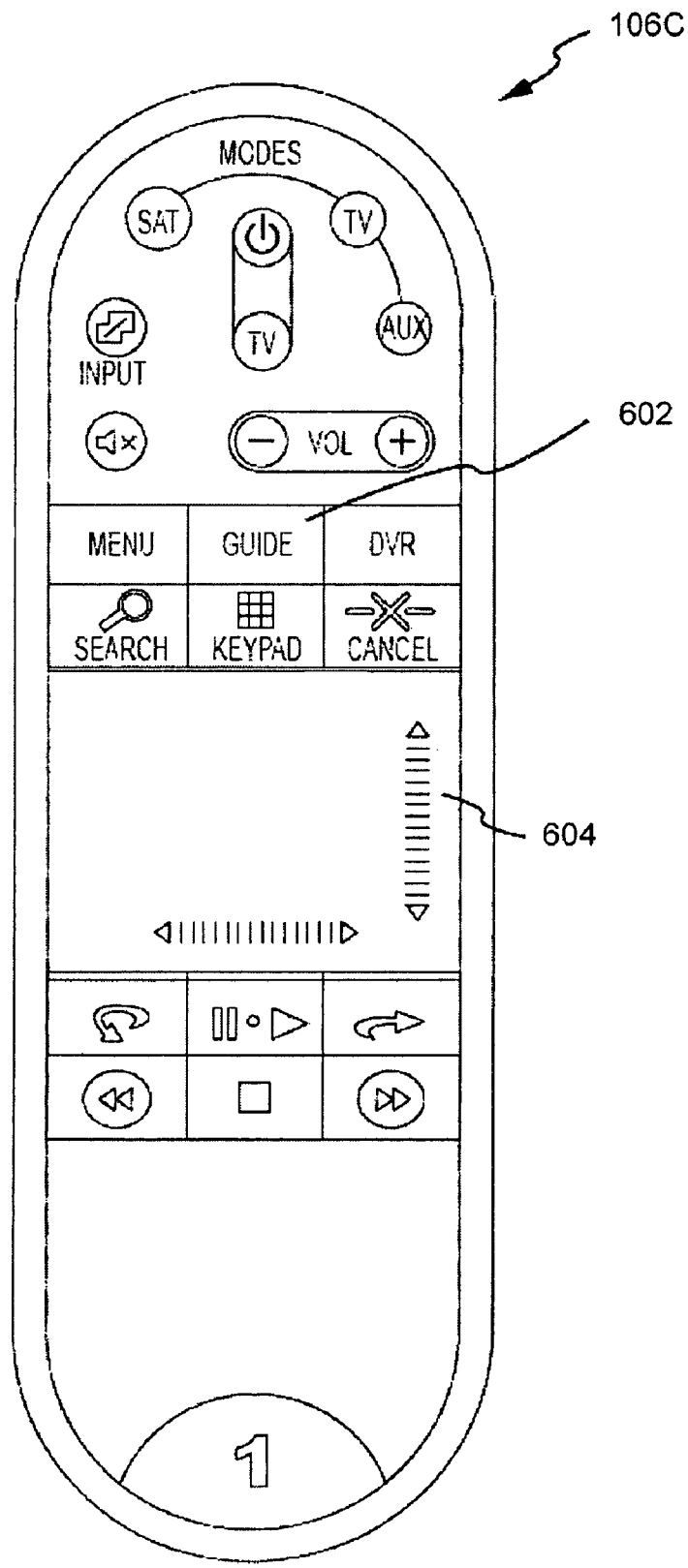
FIG. 6 illustrates an embodiment of a touch pad remote control of FIG. 1.

FIG. 6 illustrates an embodiment of a touch pad remote control of FIG. 1. The remote control 106C includes a plurality of buttons 602 and a touch pad 604 and will be discussed in reference to the entertainment system 100 illustrated in FIGS. 1 and 2. The remote control 106C may include other components, elements or devices not illustrated for the sake of brevity.

The remote control 106C includes a plurality of buttons 602 and a touch pad 604 that are operable to receive input from the user 108 (see FIG. 1). The control logic 210 of FIG. 2 (not shown in FIG. 6) of the remote control 106C is operable to process the input provided by the user 108 to the buttons 602 and the touch pad 604 and generate commands for the entertainment device 102 and/or the presentation device 104.

The input of the touch pad 604 is also utilized to determine whether a user 108 is touching the remote control 106C. For example, the user 108 may place their finger on the touch pad 604 as they pick up the remote control 106C. The control logic (not shown in FIG. 6) of the remote control 106C is operable to process the input that indicates a user 108 has picked up the remote control and activate backlighting for the buttons 602. In at least one embodiment, the remote control 106C may include other sensing circuitry, such as a capacitive sensor positioned along the periphery of the remote control 106C, that is operable to detect when a user 108 has picked up the remote control 106C. Additionally, if the touchpad 604 surface is sufficiently close to the remote control 106C edges, then the touchpad 604 may detect a user 108 who has picked up the remote control 106C.

In some scenarios, it may be inappropriate to backlight a remote control 106 (see FIG. 1) even if a user 108 is presently utilizing the remote control 106. For example, if a room is full of light, then the user 108 may not require the backlighting of the remote control 106. Thus, it at least one embodiment, a remote control 106 may further process ambient light to determine whether to activate backlighting of the remote control 106.

Figure 7:
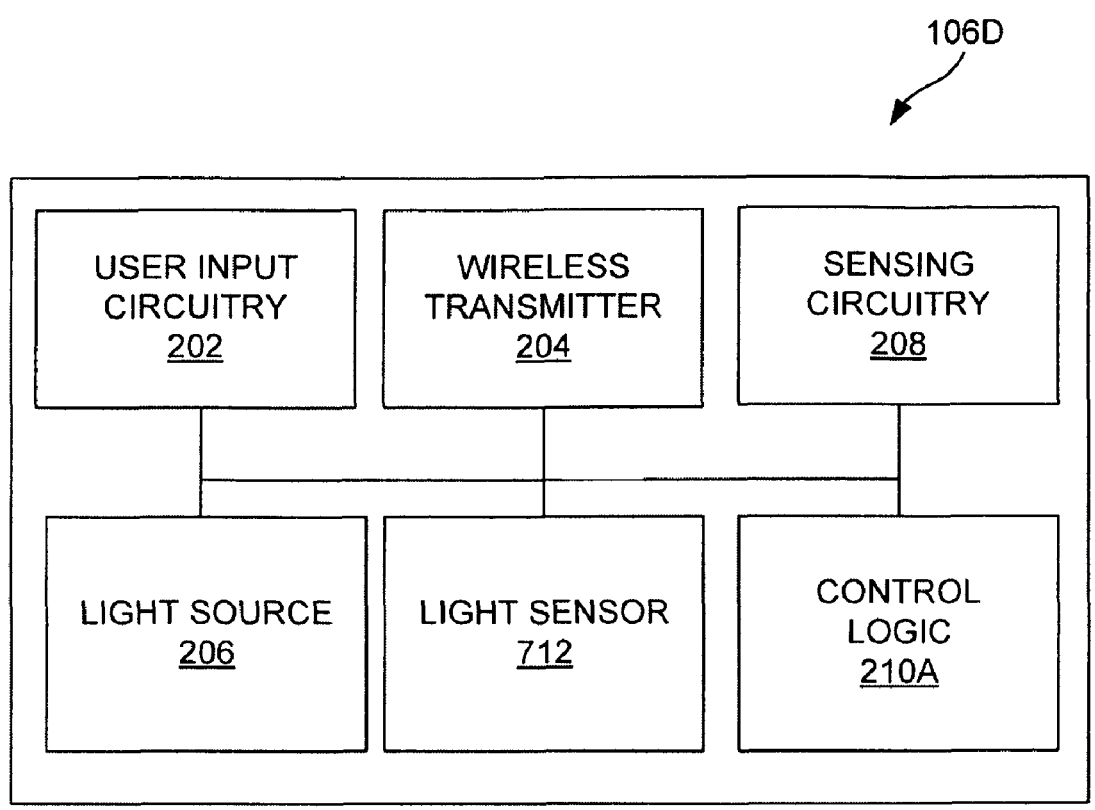
FIG. 7 illustrates an embodiment of a remote control of FIG. 1 that includes an ambient light sensor.

FIG. 7 illustrates an embodiment of a remote control of FIG. 1 that includes an ambient light sensor. FIG. 7 will be discussed in reference to the entertainment system 100 illustrated in FIG. 1. The remote control 106D includes user input circuitry 202, a wireless transmitter 204, a light source 206, sensing circuitry 208, control logic 210A and a light sensor 712. Each of these components is discussed in greater detail below. The discussion of components common to FIG. 2 will be omitted herein for the sake of brevity. The remote control 106D may include other components, elements or devices omitted herein for the sake of brevity.

The light sensor 712 is operable to detect an amount of ambient light surrounding the remote control 106D. The light sensor 712 may comprise any type of photosensor or photodetector operable to detect light. In at least one embodiment, the light sensor 712 operates to determine the light intensity at the location of the remote control 106A. The light intensity at the location is indicative of the amount of ambient light surrounding the remote control 106D. The resulting input is transmitted from the light sensor 712 to the control logic 210A for further processing.

The control logic 210A may be similar to the control logic 210 of FIG. 2. The control logic 210A is operable to process the inputs from the sensing circuitry 208 and the light sensor 712 to determine when to activate the light source 206 to backlight the user input circuitry 202. For example, the control logic 210A may receive input from the sensing circuitry 208 indicating that the user 108 is touching the remote control 106A. The control logic 210A further processes the input from the light sensor 712 to determine whether the room is dark. If the room is dark, then the control logic 210A activates the light source 206 to backlight the user input circuitry 202. Otherwise, if the room is not dark, then the control logic 210A does not activate the light source 206. The threshold amount of light utilized by the control logic 210A to backlight the user input circuitry 202 may be specified based on design criteria.

Figure 8:
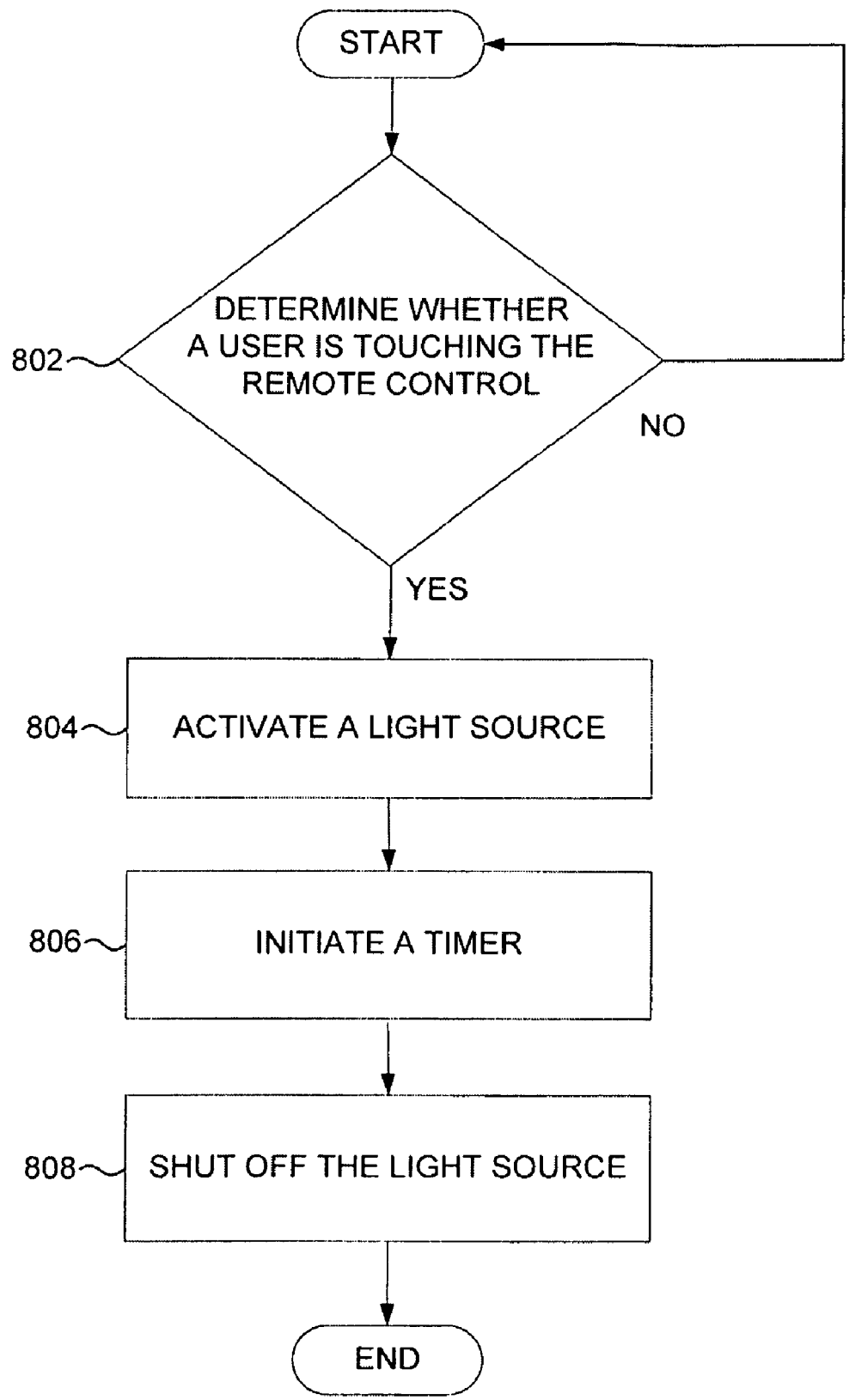
FIG. 8 illustrates an exemplary process operable to backlight a remote control.

FIG. 8 illustrates an exemplary process operable to backlight a remote control. The process of FIG. 8 operates to backlight a remote control responsive to detection of a user utilizing a remote control. The process of FIG. 8 may include other operations not illustrated for the sake of brevity.

The process includes determining whether a user is touching a remote control (operation 802). A remote control may include any type of sensor that detects touching of the remote control or movement of the remote control, which is indicative of the user using the remote control. Exemplary sensors and detection techniques are described in detail above.

The process further includes activating a light source to backlight a remote control (operation 804). The process further includes activating a timer (operation 806). The timer species how long the light source will remain in an active state to backlight the remote control. A timer may be initiated within a microprocessor of the remote control or elsewhere on the remote control using specialized timer circuitry. The period of time may be selected based on desired design criteria, such as how long the user is expected to require the backlight for providing input to the remote control. The process further includes deactivating the backlight after expiration of the timer (operation 808).

In at least one embodiment, the process described above may be disabled based on an acceptable light level. For example, the light sensor 712 (see FIG. 7) discussed above may disabled and/or the light source may not be activated in operation 804 if the room is light enough that backlighting is not needed. Alternatively the flowchart in FIG. 8 could contain an ambient light decision point between operations 802 and 804 to process the ambient light input.

Although specific embodiments were described herein, the scope of the invention is not limited to those specific embodiments. The scope of the invention is defined by the following claims and any equivalents therein.

I claim:

1. A remote control comprising:
   user input circuitry;
   at least one light source operable to backlight the user input circuitry;
   sensing circuitry operable to detect a user touching the remote control; and
   control logic communicatively coupled to the light source and the sensing circuitry, the control logic operable to activate the light source responsive to the sensing circuitry detecting the user touching the remote control wherein the control logic is further operable to deactivate the light source after a first specified time period following detection of the user touching the remote control when an input is not received via the user input circuitry and deactivate the light source after a second specified time period when the input is received via the user input circuitry during the first specified time period wherein the second specified time period is shorter than the first specified time period.

2. The remote control of claim 1, wherein the sensing circuitry comprises a capacitive sensor that detects the user touching the remote control.

3. The remote control of claim 1, wherein the sensing circuitry comprises a resistive sensor that detects the user touching the remote control.

4. The remote control of claim 1, wherein the sensing circuitry comprises an accelerometer that detects the user moving the remote control.

5. The remote control of claim 1, wherein the sensing circuitry comprises a mercury switch that detects the user moving the remote control.

6. The remote control of claim 1, wherein the sensing circuitry comprises a gyroscope that detects the user moving the remote control.

7. The remote control of claim 1, wherein the control logic is further operable to deactivate the light source responsive to input from the sensing circuitry indicating that the user is no longer touching the remote control.

8. The remote control of claim 1, wherein the control logic is operable to activate the light source to backlight a portion of the user input circuitry based upon input provided to the user input circuitry by the user.

9. A remote control comprising:
   user input circuitry;
   at least one light source operable to backlight the user input circuitry;
   a light sensor operable to detect an amount of ambient light;
   sensing circuitry operable to detect a user touching the remote control, wherein the sensing circuitry comprises a capacitive sensor that detects the user touching the remote control, the capacitive sensor comprising:
      at least one positive electrode;
      a plurality of negative electrodes;
      at least one dielectric material that separates the at least one positive electrode from the plurality of negative electrodes; and
      at least one overlay that covers at least a portion of the at least one positive electrode, at least a portion of the plurality of negative electrodes and at least a portion of the at least one dielectric material; and
   control logic communicatively coupled to the light source, the light sensor and the sensing circuitry, the control logic operable to activate the light source responsive to the sensing circuitry detecting the user touching the remote control if the amount of ambient light is below a predetermined threshold.

10. The remote control of claim 9, wherein the control logic is further operable to deactivate the light source responsive to input from the sensing circuitry indicating that the user is no longer touching the remote control.

11. The remote control of claim 9, wherein the control logic is further operable to deactivate the light source after a specified time period following detection of the user touching the remote control.

12. The remote control of claim 9, wherein the control logic is operable to activate the light source to backlight a portion of the user input circuitry based upon input provided to the user input circuitry by the user.

13. A remote control comprising:
   a plurality of buttons;
   a touch pad;
   at least one light source operable to backlight the buttons; and
   control logic communicatively coupled to the light source, the buttons and the touch pad, the control logic operable to:
   receive user input from the buttons and the touch pad and generate commands for a controlled device based on the user input;
   determine whether the user is touching the remote control based upon a signal from the touch pad;
   activate the light source responsive to determining that the user is touching the remote control;
   deactivate the light source after a first specified time period following detection of the user touching the remote control when an input is not received via at least one of the buttons or the touch pad; and
   deactivate the light source after a second specified time period when the input is received via the at least one of the buttons or the touch pad during the first specified time period wherein the second specified time period is shorter than the first specified time period.

14. The remote control of claim 13, further comprising:
   a light sensor operable to detect an amount of ambient light;
   wherein the control logic is operable to activate the light source when the user is touching the remote control based further upon a determination that the amount of ambient light is below a specified threshold.

\* \* \* \* \*

UNITED STATES PATENT AND TRADEMARK OFFICE
CERTIFICATE OF CORRECTION

PATENT NO. : 8,134,475 B2  
APPLICATION NO. : 12/404848  
DATED : March 13, 2012  
INVENTOR(S) : William R. Reams Page 1 of 1

It is certified that error appears in the above-identified patent and that said Letters Patent is hereby corrected as shown below:

Title Page

Item (12):  
"United States Patent R."  
Should read,  
--United States Patent Reams--.

Item (75):  
"William Reams R., Englewood, CO (US)" should read, --William R. Reams, Englewood, CO (US)--.

Signed and Sealed this  
Thirtieth Day of April, 2013

Teresa Stanek Rea  
*Acting Director of the United States Patent and Trademark Office*